United States Patent
McCarty et al.

[19]

[11] Patent Number: 5,946,660
[45] Date of Patent: Aug. 31, 1999

[54] AUTOMATED STORAGE SYSTEM

[75] Inventors: Charles H. McCarty, Green Valley, Ariz.; Bonita S. Linder, Mahtomedi, Minn.

[73] Assignee: Chas-Tech, Inc., Tucson, Ariz.

[21] Appl. No.: 08/780,712

[22] Filed: Jan. 8, 1997

[51] Int. Cl.⁶ .................................................. G06F 19/00
[52] U.S. Cl. .................................................. 705/5; 705/1
[58] Field of Search ........................... 705/5, 4, 6, 16, 705/22, 26, 1; 235/375, 380, 382, 385

[56] References Cited

U.S. PATENT DOCUMENTS

| | | |
|---|---|---|
| 3,857,018 | 12/1974 | Stark et al. . |
| 4,204,635 | 5/1980 | Hofmann et al. . |
| 4,857,714 | 8/1989 | Sunyich . |
| 4,970,655 | 11/1990 | Winn et al. . |
| 5,088,586 | 2/1992 | Isobe et al. ........................... 194/205 |
| 5,126,732 | 6/1992 | Mardon . |
| 5,192,854 | 3/1993 | Counts . |
| 5,223,829 | 6/1993 | Watabe . |
| 5,231,272 | 7/1993 | Mardon . |
| 5,233,343 | 8/1993 | Mazzoni . |
| 5,278,538 | 1/1994 | Ainsworth et al. . |
| 5,463,546 | 10/1995 | Parkhurst . |
| 5,475,378 | 12/1995 | Kaarsoo et al. . |
| 5,537,315 | 7/1996 | Mitcham ..................................... 705/4 |
| 5,732,398 | 3/1998 | Tagowa ..................................... 705/26 |

*Primary Examiner*—Melanie A. Kemper
*Attorney, Agent, or Firm*—Haugen Law Firm PLLP

[57] ABSTRACT

An automated storage system comprising a plurality of self-storage, facilities which are collectively networked to a central command center, wherein a customer may communicate with the central command center via an interactive kiosk located at each of the storage facilities or auxiliary access means, such as the Internet, to undertake various self-storage related transactions without the need for an attendant.

24 Claims, 9 Drawing Sheets

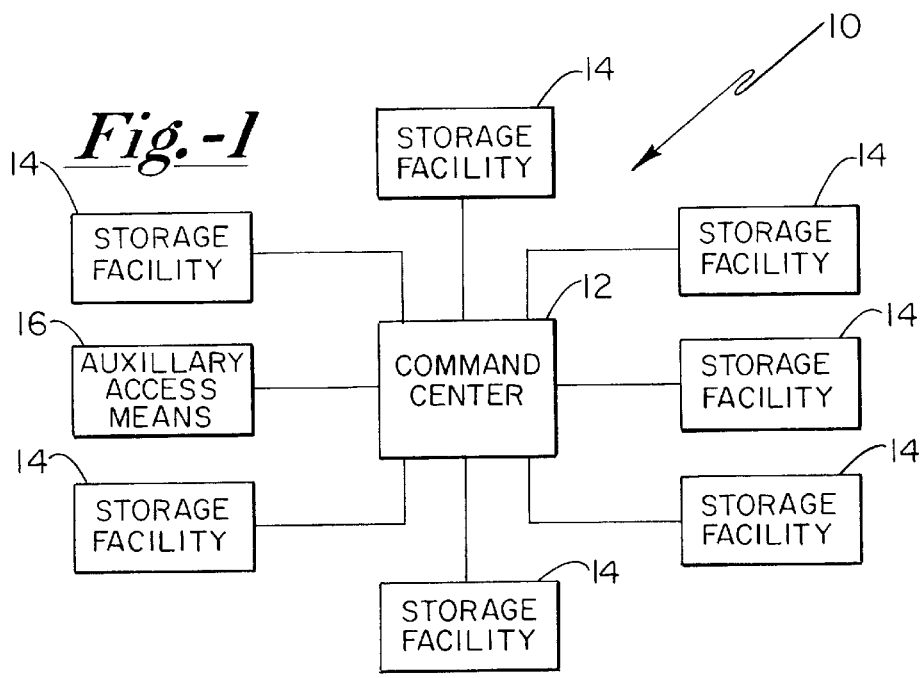
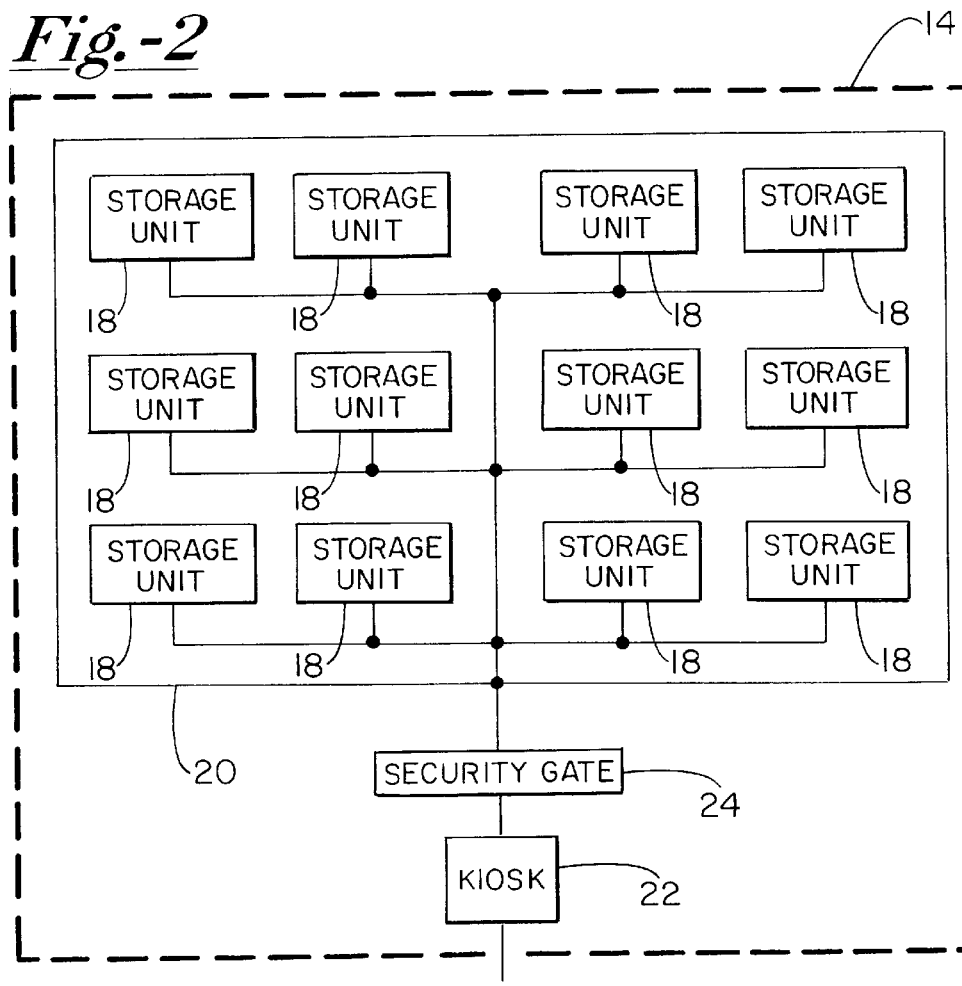

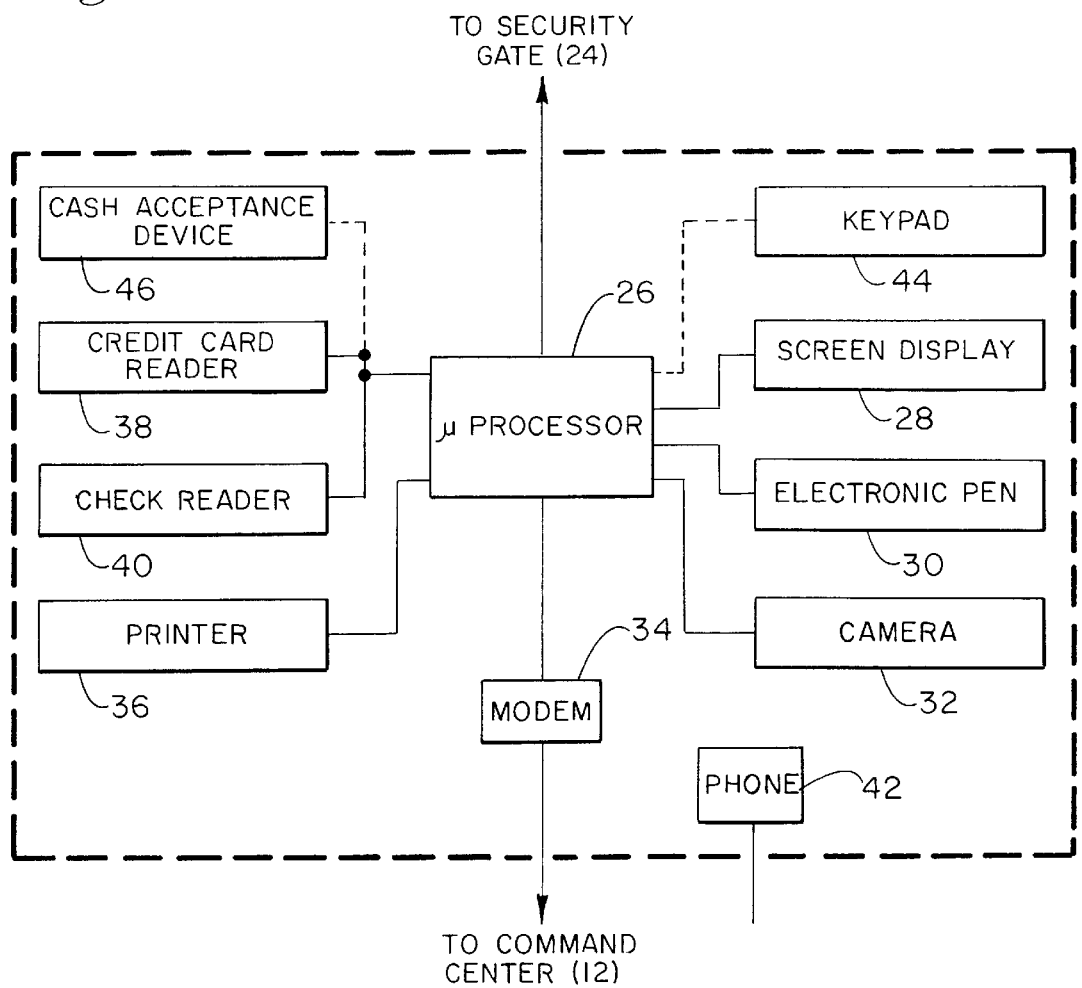

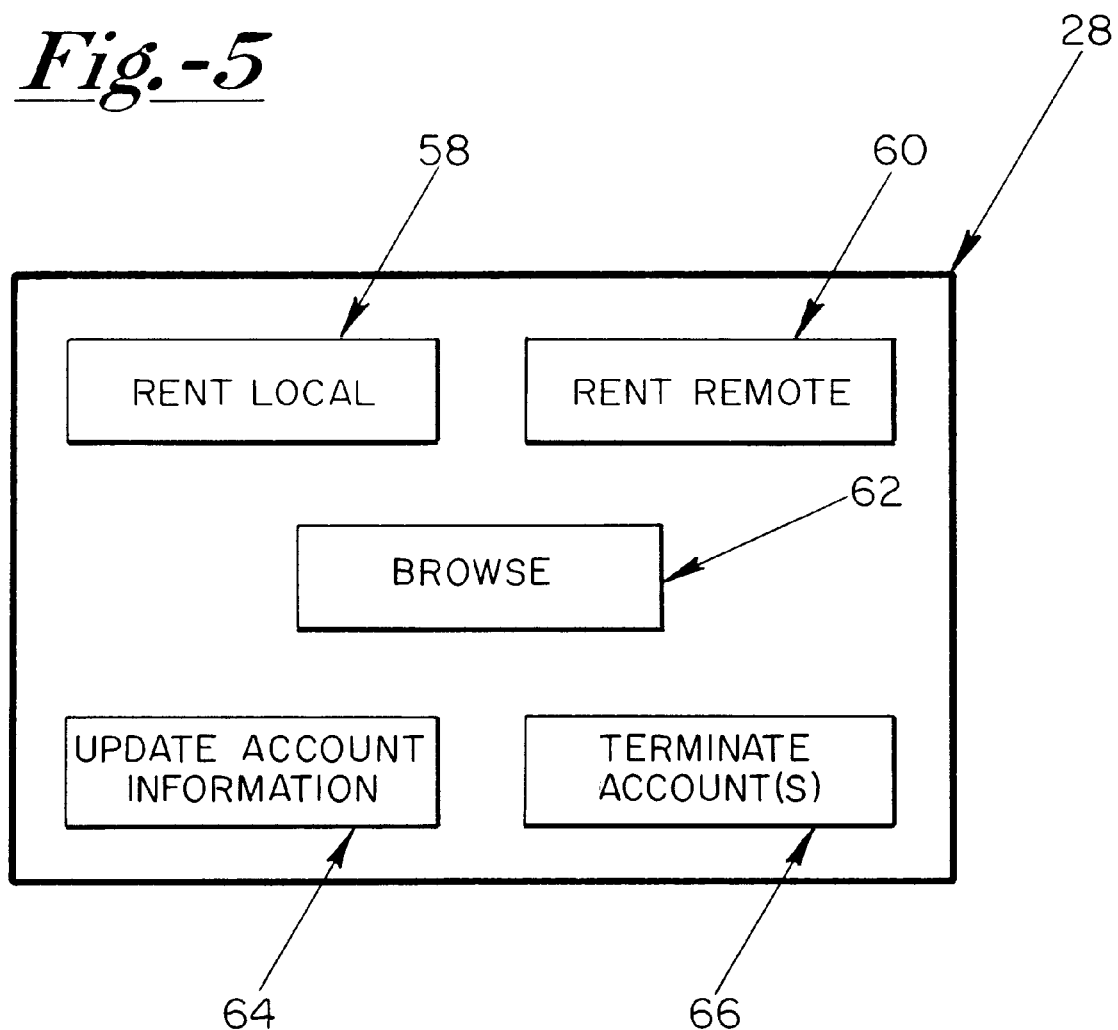

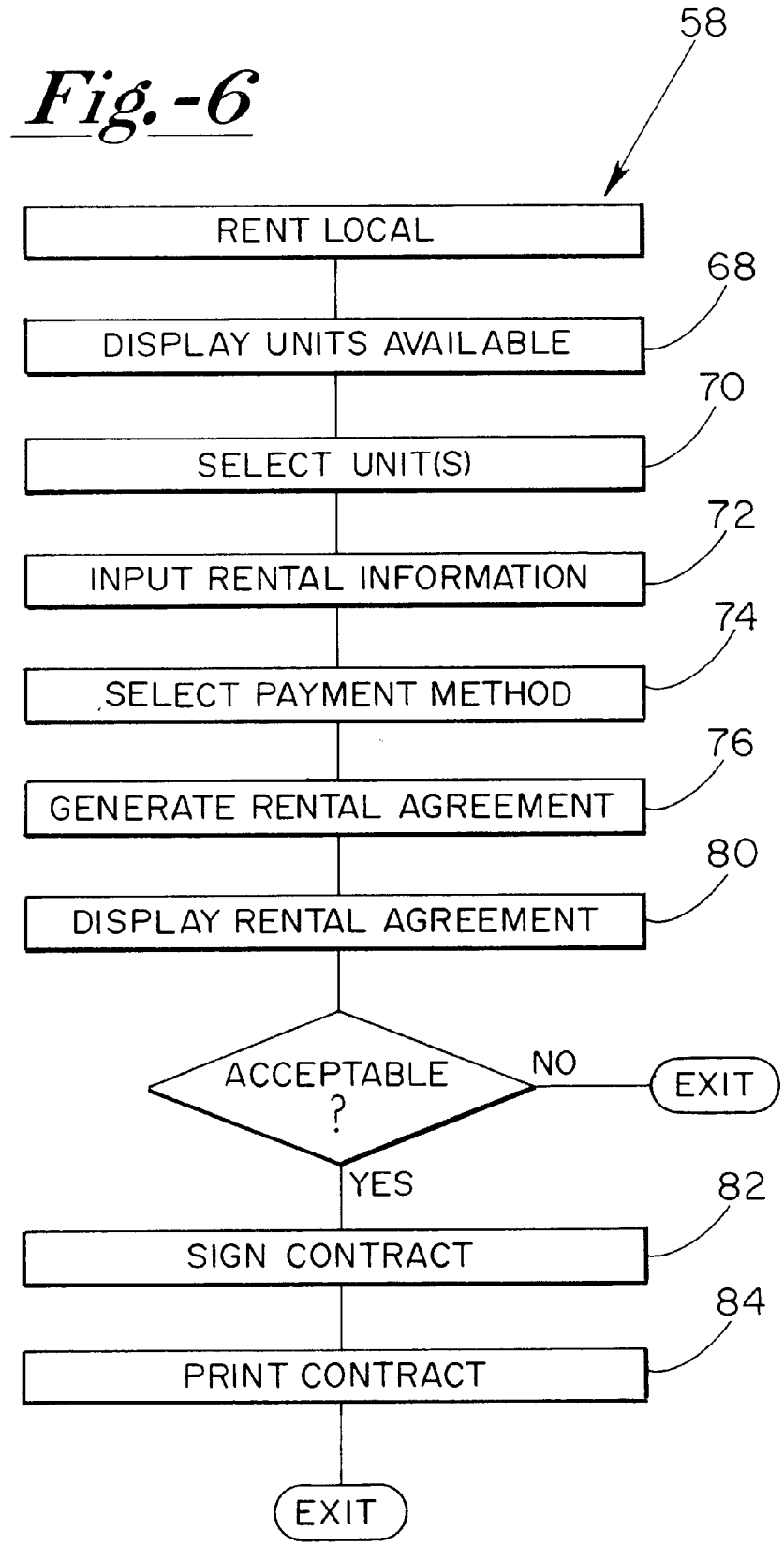

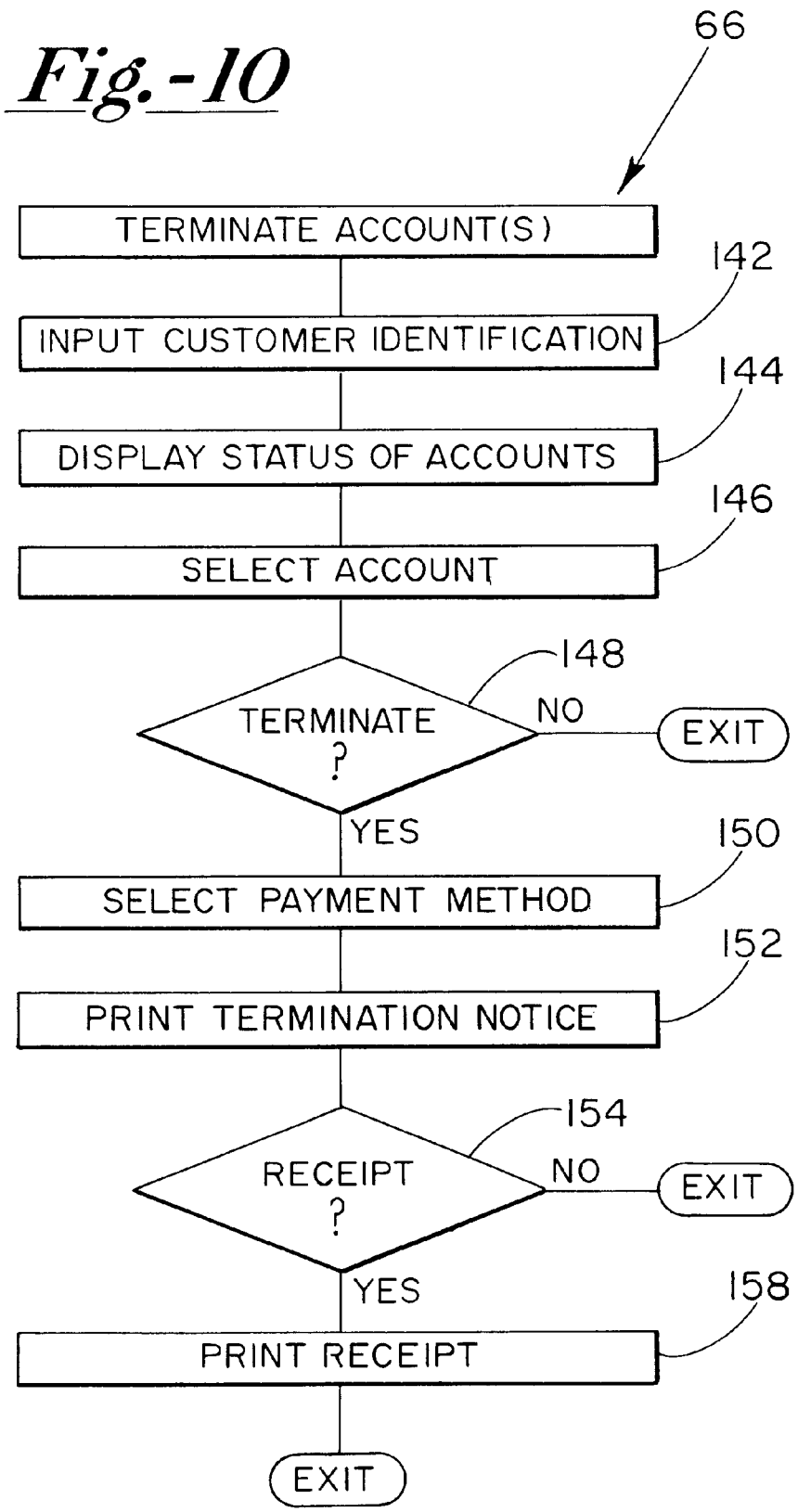

AUTOMATED STORAGE SYSTEM

BACKGROUND OF THE INVENTION

I. Field of the Invention

The present invention relates generally to self-storage facilities, commonly referred to as "mini-storage" facilities, wherein a customer may rent from available storage units for the purpose of safeguarding various articles for a given period of time. More particularly, the present invention relates to an automated storage system comprising a plurality of self-storage facilities which are collectively networked to a central command center wherein a customer may communicate with the central control module in one of several fashions to allow the customer to choose from and undertake various transactional options without the need for an attendant.

II. Discussion of the Prior Art

Self-storage facilities are well known in the art and generally comprise a plurality of individual storage units disposed within a secured perimeter for the purpose of safeguarding/storing articles. In a typical arrangement, each storage unit includes a storage compartment disposed within a garage or shed-like structure for receiving goods/articles therewithin, a door member for accessing the interior of the storage compartment, and a locking mechanism for fastening the door member in a closed position to securely maintain the contents of the storage compartment when unattended. The secured perimeter typically includes a fence or barrier surrounding the storage facility having at least one gate for exiting and entering, wherein gate access is restricted to only those individuals having proper clearance or authorization to enter the storage facility so as to deter theft and/or vandalism. The storage units are usually offered for rent for various periods of time such that a person in need of short or long term storage may simply lease one or more storage units until such time that they are able to transfer or otherwise dispose of the stored goods. While the self-storage facilities of the prior art do accomplish the goal of providing temporary storage space to people in need thereof, there are several significant disadvantages which precipitate the need for the present invention.

First, the renting of the individual storage units is typically accomplished by manning each storage facility with at least one attendant on duty who can transact with potential customers and assign available storage units. This is problematic, however, in that a separate office or attendant station is required to provide a place for the attendant to conduct business with the general public and perform the various rental transactions for the self storage facility, thereby increasing the overhead costs associated with operating the self storage facility. More specifically, the office building or attendant station is costly in terms of the materials used for construction, as well as the costs of heating, air conditioning, and/or equipping the office space with the tools for conducting business. The office building is also costly in that it reduces the overall amount of real estate within the storage facility which may be used for storage units, thereby effectively reducing the number of storage units which can be offered to the public. Furthermore, the salary which must be paid to the attendant adds to the overhead costs of providing the storage facility which, as will be appreciated, may translate into higher rental costs for the customer.

Another significant drawback with the self storage facilities of the prior art is that the process of renting storage units can be burdensome and time consuming. To further explain, self storage attendants are typically only required to be on the premises during restricted business hours, such as from 7:00 a.m. to 9:00 p.m. This can lead to lost business opportunity and/or frustration on the part of potential customers who are unable to visit the storage facility during the preselected business hours in that the potential customers are unable to transact with an attendant to rent from the available storage units. Moreover, when moving to a remote geographical location, such as during a job transfer, an individual may have to engage in a multitude of phone calls to the various self storage facilities in the new local in order to inquire as to the availability of storage units, as well as to comparison shop with regard to rental fees and terms. This may end up being quite expensive for the person moving, both with regard to the costs of the usually long-distance phone calls, in addition to the amount of time consumed inquiring with the rental agents or attendants at the remote self storage facilities.

A need therefore exists for an improved self storage system which overcomes the aforementioned deficiencies in the prior art. To be more specific, a need exists for an improved self storage system which obviates the need for an attendant to be on duty for the purpose of transacting with potential customers and assigning available storage units. A need also exists for an improved self storage system which does not require a separate office or attendant station so as to maximize the amount of real estate within each self storage facility which may be used for storage units and reduce the overhead associated with operating self storage facilities. A further need exists for an improved self storage system which allows potential customers to conduct business with self storage facilities in a variety of different geographical locations at any given time in the day and without incurring expense.

SUMMARY OF THE INVENTION

It is accordingly a principal object of the present invention to provide an improved self storage system which obviates the need for an attendant to be on duty for the purpose of transacting with potential customers and assigning available storage units.

It is yet another principal object of the present invention to provide an improved self storage system which does not require a separate office or attendant station so as to maximize the amount of real estate within each self storage facility which may be used for storage units and reduce the overhead associated with operating self storage facilities.

It is a further object of the present invention to provide an improved self storage system which allows potential customers to conduct business with self storage facilities in a variety of different geographical locations at any given time in the day and without incurring expense.

In accordance with the present invention, the foregoing objects and advantages are achieved by providing an improved storage system, comprising a plurality of storage facilities, each of the plurality of storage facilities including a plurality of storage units disposed within a secured perimeter and kiosk means for providing automated rental transactions. The kiosk means including processing means communicatively linked to user feedback means for communicating sensory messages to a user and for allowing a user to communicate information to the processing means, fee collecting means for collecting fees from a user, printing means for printing information, unique identification indicia accepting means for allowing a user to communicate unique identification indicia to the processing means to generate a personalized contract, and electronic communication means for establishing electronic communication with an external processing unit. The processing means includes memory means for storing program instructions for controlling the operation of the user feedback means, the fee collecting means, the printing means, the unique identification indicia accepting means, and the electronic communication means. Central processing means are further provided communicatively linked to the kiosk means within each of said plurality of storage facilities. The central processing means includes memory means for storing rental information for each of the plurality of storage units within each of the plurality of storage facilities. A user may use the kiosk means to access the rental information stored in the memory means of the central processing means to selectively rent one or a plurality of the storage units within one or more of the plurality of storage facilities.

In accordance with yet another broad aspect of the present invention, a system is provided for automating rental transactions in any of a plurality of storage facilities wherein each of the plurality of storage facilities includes a plurality of storage units and a central processing center having electronic storage means for storing rental information for each of the plurality of storage units within each of said plurality of storage facilities and communication means for communicating with an external access system. The external access system allows a user to communicate with the central processing center to conduct a plurality of automated rental transactions including renting from any of the plurality of storage units within the plurality of storage facilities.

In accordance with still another broad aspect of the present invention, a method is provided for automating self-storage rental transactions, comprising the steps of: (a) communicatively linking a plurality of self storage facilities to a central processing center, wherein each of the plurality of self storage facilities includes a plurality of self storage units and the central processing center includes electronic storage means containing rental information for each of the plurality of storage units within each of the plurality of self storage facilities; and (b) selectively communicating with the central processing center via external access means to automatically conduct any of a plurality of predetermined rental transaction options without the need for an attendant.

The foregoing features and advantages of the present invention will be readily apparent to those skilled in the art from a review of the following detailed description of the preferred embodiment in conjunction with the accompanying drawings and claims.

BRIEF DESCRIPTION OF THE DRAWINGS

FIG. 1 is a block diagram illustrating the fundamental components of the improved storage system of the present invention;

FIG. 2 is a block diagram illustrating the components within each storage facility of the improved storage system shown in FIG. 1;

FIG. 3 is a block diagram illustrating the various features within the kiosk associated with each storage facility;

FIG. 5 is a main screen display generated on the display unit of the kiosk shown in FIGS. 4A and 4B, illustrating the various transactional options offered to a user;

FIG. 6 is a flow chart for the RENT LOCAL transactional option;

FIG. 10 is a flow chart for TERMINATE ACCOUNT(S) transactional option.

DETAILED DESCRIPTION OF THE PREFERRED EMBODIMENTS

Figure 4A:
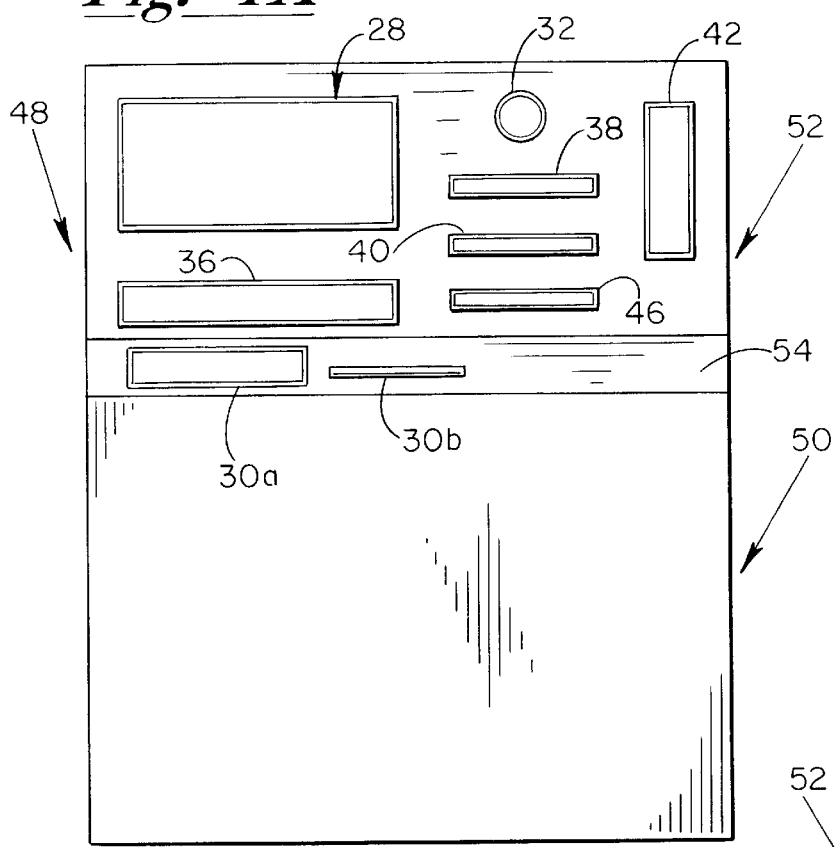
FIG. 4A is a front plan view of the kiosk illustrated in block diagram form in FIG. 3.

Referring initially to FIG. 1, shown is a block diagram illustrating an automated storage system 10 constructed in accordance with a preferred embodiment of the present invention. In its most fundamental form, the automated storage system 10 comprises a command center 12 communicatively linked to a local processing unit associated with each of a plurality of individual storage facilities 14. As will be discussed in greater detail below, the local processing unit associated with each storage facility 14 is fully automated so as to eliminate the need for an on-duty attendant and, by virtue of the cooperative network established with the command center, allows a user to conduct a number of different self-storage-related transactions with both the local storage facility 14 where the user is physically located, as well as other remote storage facilities 14 networked to the command center 12. The command center 12 itself comprises a computer server having communication means, database management means, and processing means. The communication means of the command center 12 is used to establish data communication with the local processing unit associated with each storage facility 14. The communication means of the command center 14 may also be equipped to communicate with auxiliary access means 16 such that a person may undertake any number of rental transactions without requiring the person to be physically located at one of the storage facilities 14. For example, the command center 12 may be ported to an Internet website such that a customer having access to the Internet may conduct rental transactions via auxiliary access means 16 comprising a home computer having web browsing capability. The database management means of the command center 12 is used to manage a database containing customer information pertaining to each of the storage facilities 14 within the automated storage system 10. The processing means within the command center 12 is provided to coordinate the overall operation of the automated storage system 10 and perform certain specific functions.

FIG. 2 is a block diagram representation of each self storage facility 14 within the automated storage system 10 illustrated generally in FIG. 1. In a preferred embodiment, each storage facility 14 comprises a plurality of individual storage units 18 disposed within a secured perimeter 20, a local processing unit in the form of an interactive kiosk 22, and a security gate 24 interconnected between the interactive kiosk 22 and the secured perimeter 20. Although the following discussion is based upon providing the local processing unit as an interactive kiosk 22, it is to be readily understood that the local processing unit may be disposed in any number of different structural embodiments, including but not limited to rack-mount cabinetry for installation into a preexisting structure within each storage facility 14. It is furthermore to be understood that the storage facilities 14 within the system 10 may be provided without the secured perimeter 20 and security gate 24 illustrated in FIG. 2 without departing from the scope of the present invention. With collective reference to FIGS. 2 and 3, each interactive kiosk 22 provided in accordance with a preferred embodiment of the present invention includes processing means in the form of a microprocessor 26, user feedback means in the form of a screen display 28, unique identification indicia accepting means in the form of an electronic pen assembly 30, video capture means in the form of a camera 32, data communication means in the form of a modem 34, printing means in the form of a printer 36, monetary transfer means in the form of a credit card reader 38 and a check reader 40, and audio communication means in the form of a telephone 42. In an alternate embodiment, indicated with dashed lines, the ki-osk may also include manual input means in the form of a keypad 44, and the monetary transfer means may further include a cash acceptance device 46 for accepting legal tender within the kiosk 22.

In the preferred embodiment, the microprocessor 26 is communicatively linked to the screen display 28, the credit card reader 38, the check reader 40, the printer 36, the modem 34, the electronic pen 30, the camera 32, and the security gate 24 of the secured perimeter 20. More specifically, the microprocessor 26 includes memory means for storing program instructions for controlling the operation of the screen display 28, the credit card reader 38, the check reader 40, the printer 36, the modem 34, the electronic pen 30, the camera 32, and for dispensing a code to the user for use in entering and exiting through the security gate 24. The screen display 28 may comprise any number of commercially available screen displays for visually communicating instructions and information to the user. However, in a preferred embodiment, the screen display 28 comprises a touch-screen display which is also capable of communicating information in the form of responses back to the microprocessor 26. In such an arrangement, a user may simply press from a variety of touch-sensitive icons which are generated on the screen display 28 by the microprocessor 26 so as to control the operation of the automated storage system 10 of the present invention. If a keypad 44 is employed, it may also be used to respond to the various instructions set forth on the screen display 28 to provide yet another means for controlling the operation of the automated storage system 10. The keypad 44 may comprise any number of commercially available keypad or keyboard assemblies, including but limited to a QWERTY keyboard or various other keypads having predetermined function keys specifically programmed to operate the automated storage system 10 of the present invention.

Although not shown in detail, the electronic pen assembly 30 used in the interactive kiosk 22 of the present invention is well known in the art and generally comprises an electronic input template and an electronic pen, wherein a user may employ the electronic pen to generate a signature on the electronic input template which, in turn, stores the signature in the memory means of the microprocessor 26. As will be described in greater detail below, the electronically generated signature is incorporated into the various contracts and agreements saved within the memory means of the microprocessor 26 for the purpose of generating fully executed and legally binding contracts and agreements between the user and the management company or owner of the individual self storage facilities. It is also contemplated that any number of devices may be used as substitute for or as complement to the electronic pen assembly 30 for receiving unique identification indicia specific to each potential customer. For example, fingerprint recognition means may be provided for identifying and recording the fingerprint(s) of customers for the purpose of creating legally binding agreements between the customer and each self storage facility.

The camera 32 may comprise any number of commercially available cameras, including but not limited to a video camera for capturing continuous surveillance video images and/or a traditional single exposure camera for capturing discrete photographic images of various important documents, such as a drivers licenses, passports, social security cards, etc . . . , for storage within the memory means of the microprocessor 26 of the interactive kiosk 22. The modem 34 is an important feature of the interactive kiosk 22 of the present invention in that it serves to establish data communication between the microprocessor 26 and the command center 12 shown in FIG. 1. Data communication between the microprocessor 26 and the command center 12 is essential in that it effectively links all of the storage facilities 14 within the automated storage system 10 together so as to allow a person using the interactive kiosk 22 at any one of the storage facilities to conduct a number of automated transactions at both the local storage facility 14 and all of the remotely located storage facilities 14. As will be explained in greater detail below, this is extremely advantageous in terms of convenience that it allows a person to rent storage units 18 at remote storage facilities 14 without having to incur the burden and expense of conducting a multiplicity of long distance phone calls to search for and rent a remote storage unit, such as is the case with the prior art self storage facilities discussed supra. The modem 34 may comprise any number of commercially available modems and, although the modem 34 is set forth in the preferred embodiment shown in FIG. 3, it is to be readily understood that a static data communication link, such as via a fiber optic and/or co-axial cable, may be substituted for the modem 34 without departing from the scope of the present invention.

The printer 36 is primarily provided as a means for producing hard copies of the executed rental agreements, payment receipts, and/or termination notices for the user's personal records and may comprise any number of different commercially available printers, including but not limited to laser printers and ink jet printers. As will be appreciated, the credit card reader 38 and check reader 40 are employed to provide quick and efficient monetary transfers for the purposes of making rental payments for the storage units. Although the credit card reader 38 and check reader 40 are set forth as the preferred embodiment of the aforementioned monetary transfer means, it is to be readily understood that these are set forth by way of example and not limitation in that any number of money accepting devices may be further incorporated or substituted into the interactive kiosk 22 for the purposes of transacting with the automated storage system 10, such as automatic fund transfer arangement, wherein funds are automatically withdrawn from the customer's bank account, as well as the cash accepting device 46 shown in FIG. 3. In a preferred embodiment of the present invention, the telephone 42 is configured to provide an automatic communication link with a 24-hour customer service line wherein users may speak with a customer service representative for individual assistance or engage in an automated audio (touch-tone) reservation/renting system.

Figure 4B:
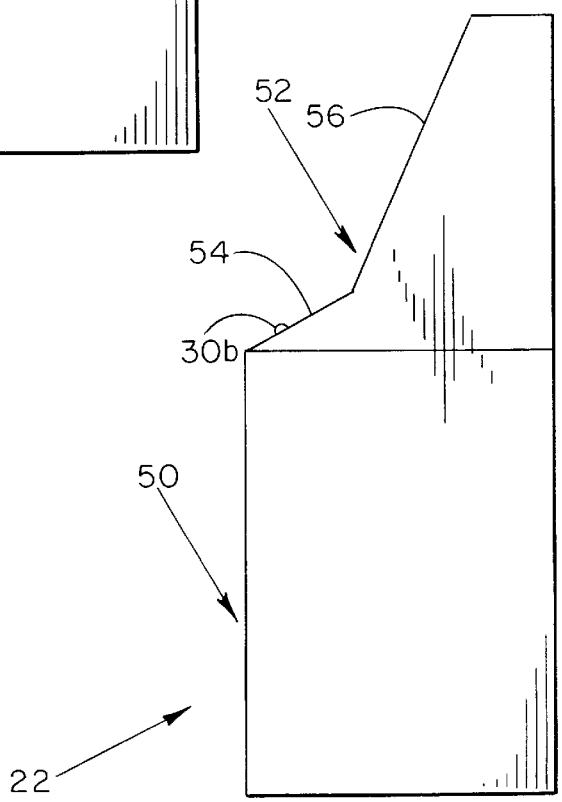
FIG. 4B is a side plan view of the kiosk illustrated in FIG. 4A.

With collective reference to FIGS. 4A and 4B, shown is an exemplary embodiment of the interactive kiosk 22 of the present invention. Structurally, the interactive kiosk 22 includes a housing member 48 having a lower console unit 50 and an upper console unit 52. Although not shown, the lower and upper console units 50, 52 are generally hollow in construction so as to house the microprocessor 26, the modem 34, the attendant electrical wiring and cabling connecting the various components of the interactive kiosk 22, and the paper supply for the printer 365. The upper console unit 52 has a lower angular portion 54 and an upper angular portion 56. In the preferred embodiment shown, the upper angular portion 56 of the upper console unit 52 contains the screen display 28, the printer 36, the camera 32, the credit card reader 38, the check reader 40, and the telephone 42, while the lower angular portion 54 includes the electronic pen assembly 30 comprising an electronic input template 30a and an electronic pen 30b. It is to be readily understood that the structure of the housing member 48 is provided by way of illustration and not limitation and that the housing member 48 may be modified and reconfigured in any number of different fashions without departing from the scope of the present invention. In similar fashion, the layout and physical interrelation of the various components of the interactive kiosk 22 may also be modified and/or altered from that shown without departing from the scope of the present invention. Although not shown, the housing member 48 may be further provided with any number of heating, ventilating, air conditioning (HVAC) components therewithin so as to control the environment within the enclosure to ensure that the electronics are not subject to unduly harsh conditions.

FIG. 5 illustrates the basic self-storage related transactions which may be conducted through the use of the automated storage system 10 of the present invention. In a preferred embodiment, the basic transactional options include RENT LOCAL 58, RENT REMOTE 60, BROWSE 62, UPDATE ACCOUNT INFORMATION 64, and TERMINATE ACCOUNT(S) 66. The RENT LOCAL 58 option allows a user to rent from the available units within the local storage facility, the RENT REMOTE 60 option allows a user to rent from the available units at any number of remote storage facilities, the BROWSE 62 option allows a user to review the storage units, 18 offered within all storage faciities 14 (local and remote), the UPDATE ACCOUNT INFORMATION 64 option allows a user to make changes to their account information, such as a change of address or the like, and the TERMINATE ACCOUNT(S) 66 option allows a user to cancel any of their existing storage unit accounts. In a preferred embodiment, these transactional options are set forth prominently as touch sensitive icons on the screen display 28 of each interactive kiosk 22 within the automated storage system 10. A user may therefore undertake any of the above-identified transactional options by simply pressing the particular touch-sensitive icon on the screen display 28 or, if the keypad 44 is used in conjunction with the screen display 28, these same transactional options may also be selected via the keypad 44. Taken collectively, the aforementioned transactional options allow a user or potential customer to undertake all rental-related business without the need for an attendant or manager on-site or calling far and wide to contact remote storage facilities to inquire as to availability. As noted above, this reduces the overhead costs associated with operating self storage facilities, in addition to expanding the effective business hours of the self storage facilities by removing the need to have restricted gate hours.

With reference to FIG. 6, the RENT LOCAL 58 option allows a user to inquire as to the availability of the storage units 18 within the local storage facility 14 and undertake a full rental transaction which then allows the user to gain immediate access into the local storage facility 14 to utilize the newly rented storage unit 18. The RENT LOCAL 58 transactional option starts by displaying information regarding the storage units 18 which are currently available (step 68) so that the user may peruse the information and select one or more of the storage units 18 for rental (step 70). Following the selection step 70, the user is then prompted to input personal rental information for the purposes of establishing a customer account (step 72). After completing the input of rental information (step 72), the user must then select from a variety of payment methods (step 74) which may include, but are not necessarily limited to, credit card payment, check payment, automatic withdrawal from the user's bank account, and direct cash deposit. Once payment method has been verified, the processor 28 within the kiosk 22 will then generate a custom rental agreement (step 76) based on the personal rental information and system assigned information, such as the security access code and customer identification number assigned to the user. The contract generation step 76 may be facilitated by storing pre-formulated rental contracts based on applicable local, state, and federal laws having blank fields for the insertion of the personal rental information and the system assigned information. These preformulated contracts may be stored in the memory of the microprocessor 26 of each kiosk 22 or, in the alternative, within the storage means of the command center 12. After the custom rental agreement has been generated in step 76, the rental agreement is then displayed on the screen display 28 (step 80) to allow the user to review the proposed agreement prior to finalization. If the proposed rental agreement is not acceptable, then the user may simply exit the program and return to the main menu screen shown in FIG. 5. If the user finds the proposed rental agreement to be acceptable, the user may employ the electronic pen assembly 30 to sign the rental contract (step 82). A hard copy of the executed rental contract is then printed for the user (step 84) via the printer 36 and an electronic version of the executed contract may then be stored in the memory within the microprocessor 26 of the interactive kiosk 22 or in the storage means of the command center 12 for subsequent use by the owner of the particular self storage facility. If desired, the owner may generate hard copies of the executed contract at a later date by simply retrieving the electronic version of the executed contract for printing. Once the local rental transaction has been completed, the user is then provided a code or other similar type of security access means, such as a key, to pass through the secured perimeter of the storage facility 14 to access their newly rented storage unit(s).

Figure 7:
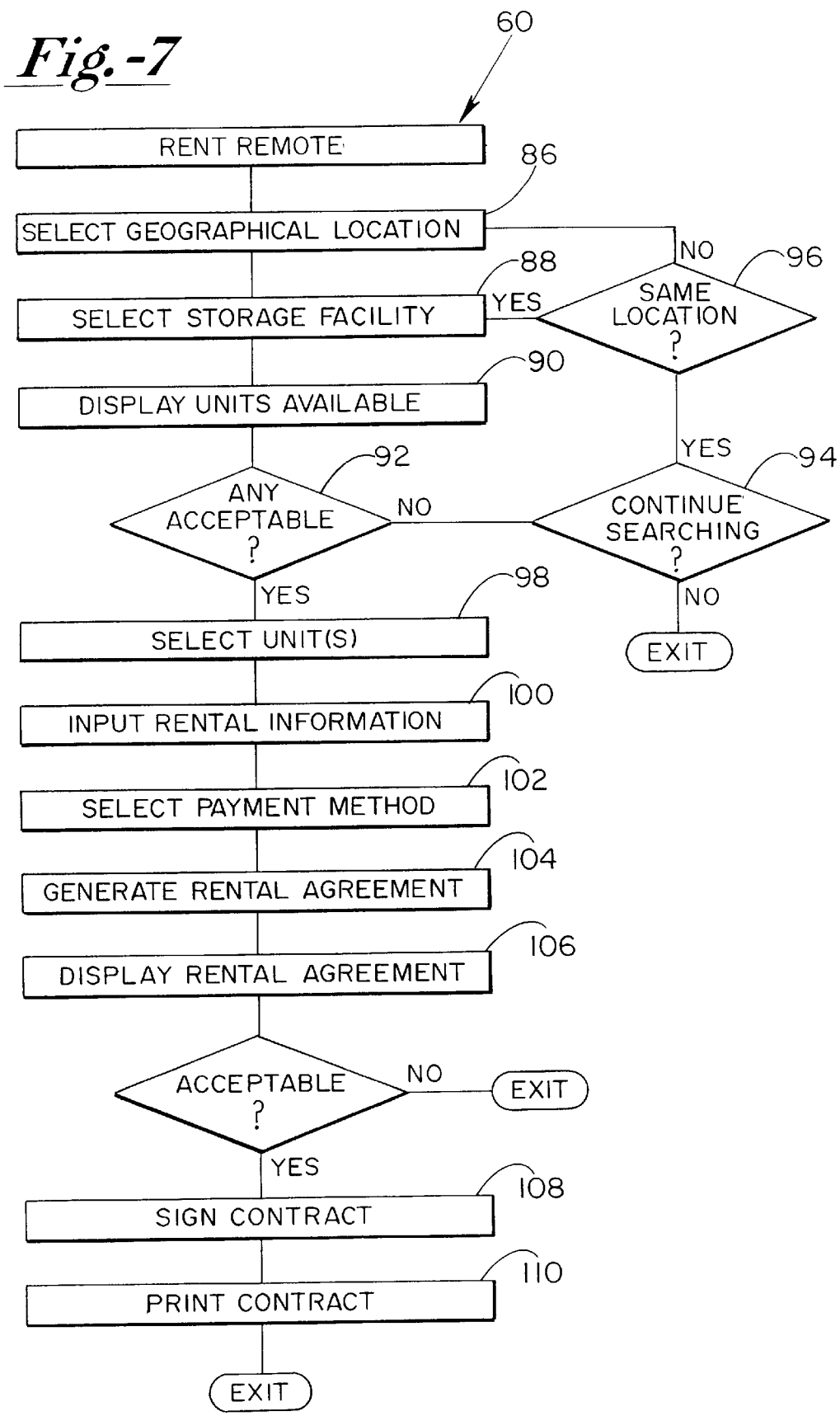
FIG. 7 is a flow chart for the RENT REMOTE transactional option.

With reference to FIG. 7, the RENT REMOTE 60 transactional option allows a user to rent from any of the available storage units 18 within any of the storage facilities 14 within the system 10. The first step 86 requires the user to select from a variety of geographical locations or regions, such as from various maps displayed on the screen display 28. Once a geographical region is selected in step 86, the screen display 28 will set forth the various storage facilities 14 within the selected region from which the user must select a particular storage facility 14 (step 88). After a particular storage facility 14 is chosen, the units which are available within the selected storage facility 14 are displayed on the screen display 28 (step 90) such that the user may evaluate the rental offerings. The user is then prompted as to whether any of the rental offerings are acceptable (step 92). If none are acceptable, the user will then be prompted (step 94) to determine whether to continue searching. If the user does not wish to continue searching, they may simply exit the system and the program will return to the main menu shown in FIG. 5. If the user does wish to continue searching, then they may be further prompted (step 96) as to whether they want to continue searching in the same location or region as previously selected. An indication by the user that they wish to search in another location returns the user to step 86 of selecting a geographical location or region so as to search among the storage facilities within a different geographical location. If the user wishes to continue to search within the originally selected geographical location, they will be returned to step 88 to select another storage facility 14. If the user finds any of the available storage units 18 within the selected storage facility to be acceptable, they are then required to select one or more of the available storage units (step 98) and input personal rental information (step 100) for the purposes of establishing a customer account.

After completing the input of rental information (step 100), the user must then follow the same steps employed in the RENT LOCAL 58 transactional option detailed above. To be more specific, the user must select from a variety of payment methods (step 102) which, once again, may include credit card payment, check payment, automatic withdrawal, and direct cash deposit. Once payment method has been verified, the processor 26 within the kiosk 22 will then generate a custom rental agreement (step 104) based on the personal rental information and system assigned information, such as the security access code and customer identification number assigned to the user. As described above, the contract generation step 104 may be facilitated by storing a pre-formulated rental contract based on applicable local, state, and federal laws having blank fields for the insertion of the personal rental information and the system assigned information. After the custom rental agreement has been generated in step 104, the rental agreement is then displayed (step 106) to allow the user to review the proposed agreement prior to finalization. If the proposed rental agreement is not acceptable, then the user may simply exit the program and return to the main menu screen shown in FIG. 5. If the user finds the proposed rental agreement to be acceptable, the user then employs the electronic pen assembly 30 to sign the rental contract (step 108). A hard copy of the executed rental contract is then printed for the user (step 110) via the printer 36 and an electronic version of the executed contract is stored for subsequent use by the owner of the particular self storage facility. Once the remote rental transaction has been completed, the user is then provided a code or other similar type of security access means, such as a key, to pass through the secured perimeter of the storage facility 14 to access their newly rented storage unit(s).

Figure 8:
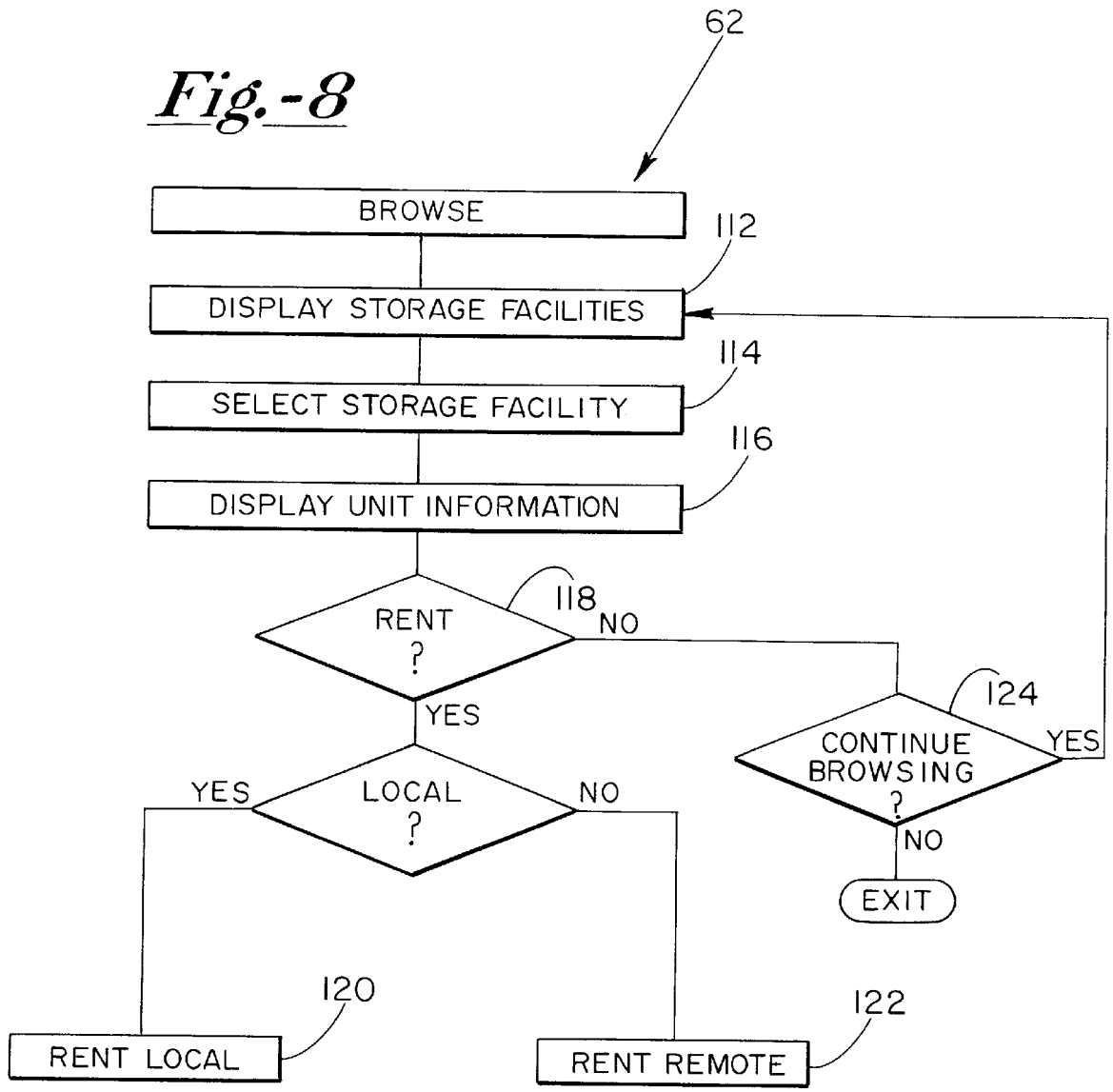
FIG. 8 is a flow chart for the BROWSE transactional option.

Referring now to FIG. 8, shown is the flow chart for the BROWSE 62 transactional option offered in accordance with a preferred embodiment of the present invention. The first step 112 involves using the screen display 28 to display the various storage facilities 14 within the automated storage system 10 of the present invention. This can be accomplished by listing the names or locations of the various storage facilities 14 networked to the command center 12 and/or providing maps which graphically illustrate the storage facilities 14 within each geographical region covered by the system 10. The next step 114 requires the user to select a particular storage facility 14 from those displayed in step 112, after which point the screen display 28 will set forth rental information pertaining to all of the storage units 18 within the selected storage facility 14 (step 116). The user is then prompted as to whether they would like to rent from the available storage units 18 within the selected storage facility (step 118). If the user indicates a willingness to rent, the command center 12 will initiate the RENT LOCAL 58 transactional option (step 120) provided the user is at the local storage facility 14 or the RENT REMOTE 60 transactional option (step 122) provided the selected storage facility is not the storage facility where the user is physically located. In the instance that the desired size is not available, or if the user does not wish to rent, they may be prompted (step 124) as to whether they wish to continue browsing or exit back to the main menu of the system. If the user chooses to continue browsing, they are thereafter led back to step 112 to a display of the storage facilities to re-initiate the aforementioned browsing procedure.

Figure 9:
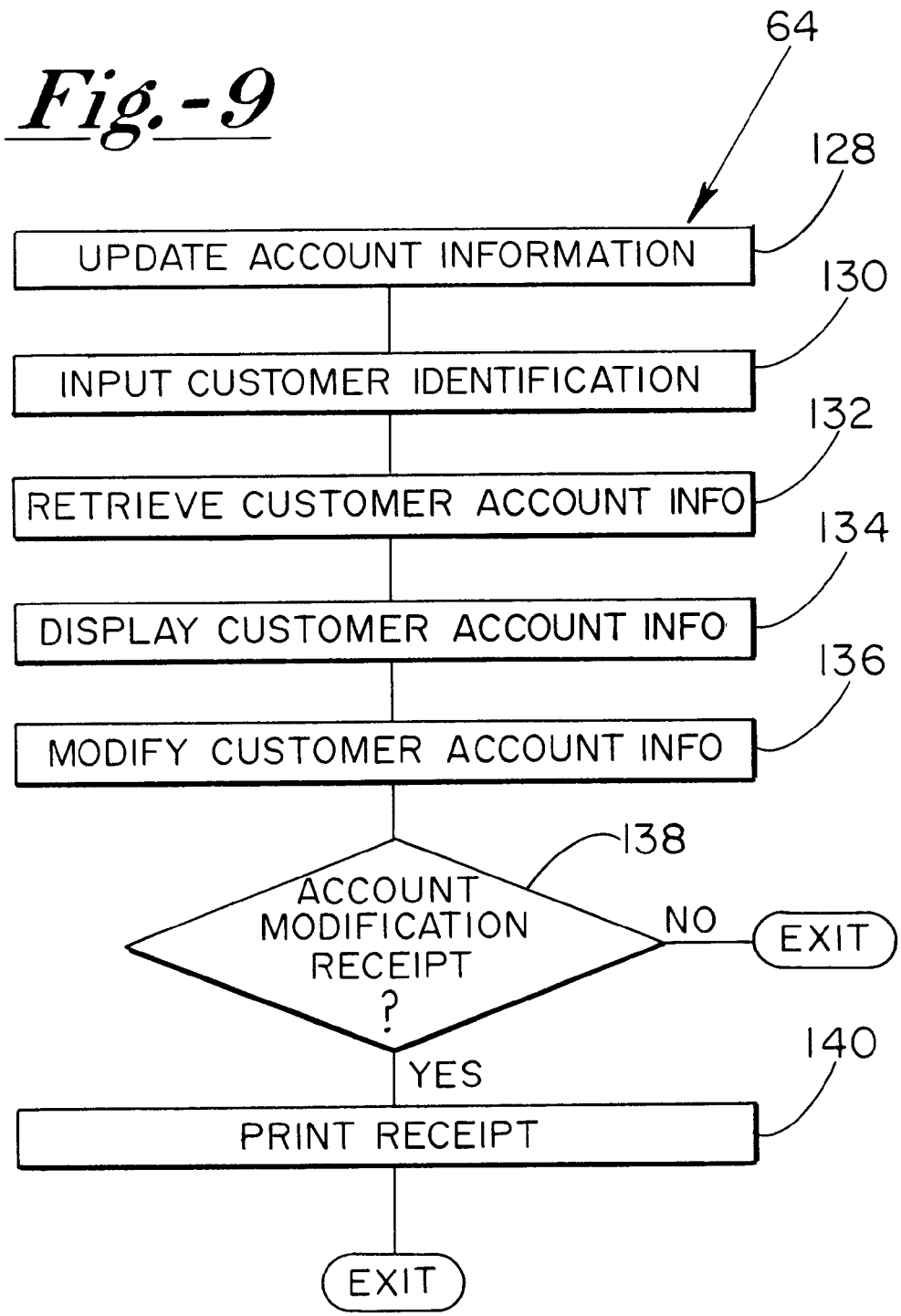
FIG. 9 is a flow chart for the UPDATE ACCOUNT INFORMATION transactional option.

FIG. 9 shows the flow chart for the UPDATE ACCOUNT INFORMATION 64 transactional option. To initiate this process, the user must first input their customer identification (step 128) i.e. the customer number assigned to the user. In the preferred embodiment, this may be accomplished via the touch sensitive icons of the screen display 28. As will be appreciated, if employed the keypad 44 may also be used to enter the appropriate customer identification. In either event, the processor 26 directs the modem 34 to establish data communication with the command center 12 to retrieve all account information specific to the user (step 130) from an accounting/management database located within the storage means associated with the command center 12. Once all account information has been retrieved in step 132, the status of each account (local and remote) is displayed (step 134). The user may thereafter modify their account information in step 136 and, upon the completion of the update, the user will be asked whether they want a receipt evidencing the account modification (step 138). If the user wants such a receipt, it will be printed in step 140, otherwise the system will simply exit the user from the program.

Turning to FIG. 10, shown is a flow chart for the TERMINATE ACCOUNT(S) 66 transactional option. As with the UPDATE ACCOUNT INFORMATION 64 option described above with reference to FIG. 9, the user must first input their user identification (step 142) so that the all of the local and remote account information specific to the user may be retrieved from the storage means of the command center 12. Thereafter, the status of each local and remote account is displayed on the screen display 28 in step 144. The user can then select which storage account(s) they would like to terminate (step 146), which is then verified in step 148. If the user in fact does wish to terminate the selected storage account, they must then select a payment method (step 150) which, as noted above, may include credit cards, checks, automatic withdrawal from the user's bank account, and cash deposit. After the payment has been made, a termination notice is thereafter printed (step 152) for the personal records of the user. A receipt for the payment may also be printed in step 158 if the user so chooses in step 154. If the user no longer has any storage accounts within a particular storage facility by virtue of terminating an account, then the command center 12 will deactivate the individual code for the user such that they are no longer able to gain access through the secured perimeter of the storage facility.

In light of the foregoing, the present invention solves the various drawbacks found in the prior art. To be more specific, the present invention provides an automated self storage system so as to eliminate the need for an attendant to be on duty for the purpose of transacting with potential customers, thereby reducing the overhead expense associated with operating self storage facilities. The automated storage system of the present invention also reduces overhead costs by eliminating the need for a separate office or attendant station within each storage facility, and furthermore maximizes the amount of real estate within each self storage facility which may be used for storage units. The automated storage facility also allows potential customers to conduct business with self storage facilities in a variety of different geographical locations at any given time in the day and without incurring expense.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, it is fully contemplated that, in addition to communicating the various transactional options as detailed above, the screen display 28 of each kiosk 22 may be further configured to convey advertisements to potential customers. Moreover, it is anticipated that the command center 12 may be further equipped with an accounting system, either external or internal to the command center 12, so as to automate the billing and accounting procedures for each storage facility 14 within the storage system 10. This type of arrangement may include providing yet another transactional option, entitled "PAY ON ACCOUNTS," which would allow a customer to interface with the accounting system to pay on accounts with outstanding balances, etc . . . In similar fashion, the command center 12 may also be equipped with various management utility program for the purpose of adding and/or removing storage facilities to the system, as well as changing the rental information pertaining to each storage unit 18 within each storage facility 14. Such a management utility program may also include reporting capabilities for assessing rental trends, customer tracking, and unit rental status.

It is also to be fully recognized that the present invention specifically includes allowing potential customers to conduct rental transactions at locations other than at the individual storage facilities 14 within the automated storage system 10. More specifically, the command center 12 may be ported to the Internet such that a customer can access the rental information. within the command center 12 using auxiliary access means 16, such as a computer equipped with any standard web browser. In this fashion, a potential customer may thereby conduct any number of rental transactions from the comfort of their own home, including but not limited to the BROWSE, RENT REMOTE, UPDATE ACCOUNT INFORMATION, and TERMINATE ACCOUNT(S) transactional options described above.

Finally, it is to be understood that each kiosk 22 may be further equipped with any of a variety of voice recognition devices, which are well known in the art, for the purpose of allowing a customer to advance through the various transactional options via voice instruction rather than manually through the use of the screen display 28 and/or the keypad 44.

What is claimed is:

1. An improved storage system, comprising:
   a plurality of storage facilities, each of said plurality of storage facilities including a plurality of storage units and kiosk means for providing automated rental transactions;
   said kiosk means including processing means communicatively linked to user feedback means for communicating sensory messages to a user and for allowing a user to communicate information to said processing means, fee collecting means for collecting fees from a user, printing means for printing information, unique identification indicia accepting means for allowing aL user to communicate unique identification indicia to said processing means to generate a personalized contract, and electronic communication means for establishing electronic communication with an external processing unit, said processing means including memory means for storing program instructions for controlling the operation of said user feedback means, said fee collecting means, said printing means, said unique identification indicia accepting means, and said electronic communication means; and
   central processing means communicatively linked to said kiosk means within each of said plurality of storage facilities, said central processing means including memory means for storing rental information for each of said plurality of storage units within each of said plurality of storage facilities;
   whereby a user may use said kiosk means to access said rental information stored in said memory means of said central processing means to selectively rent one or a plurality of said storage units within one or more of said plurality of storage facilities.

2. The improved storage system as set forth in claim 1 and further, said processing means being capable of generating a rental agreement based on personal information input by a user, said rental information, and said unique identification indicia of said user, said processing means being further equipped to direct said user feedback means to display said rental agreement, said unique identification indicia accepting means allowing a user to execute said rental agreement, and said printing means interacting with said processing means to print said executed rental agreement.

3. The improved storage system as set forth in claim 1 and further, said user feedback means comprising visual display means for visually communicating information to a user.

4. The improved storage system as set forth in claim 3 and further, said visual display means including a touch-sensitive screen display having plurality of instructional icons wherein a user may control the operation of said kiosk by manually touching said plurality of instructional icons.

5. The improved storage system as set forth in claim 1 and further, said unique identification indicia accepting means comprising means for allowing a user to generate a signature in electronic media to execute said rental agreement.

6. The improved storage system as set forth in claim 1 and further, said kiosk means including audio communication means for allowing a customer to establish audio communication with an external audio source.

7. The improved storage system as set forth in claim 1 and further, said kiosk means including video capture means for capturing video images of information during a rental transaction for storage in said memory means.

8. The improved storage system as set forth in claim 1 and further, said kiosk means including climate control means for controlling the climate within said kiosk means, said climate control means including temperature control means for controlling the temperature within said kiosk means, ventilation control means for controlling the ventilation within said kiosk means, and humidity control means for controlling the humidity within said kiosk means.

9. The improved storage system as set forth in claim 1 and further, said fee collecting means including credit card accepting means and check accepting means.

10. The improved storage system as set forth in claim 3 and further, said user feedback means including manual input means for permitting a user to manually type in information for storage in said memory means and manually inputting instructional commands.

11. A system for automating rental transactions in any of a plurality of storage facilities, wherein each of said plurality of storage facilities includes a plurality of storage units, comprising:

a central processing center having electronic storage means for storing rental information for each of said plurality of storage units within each of said plurality of storage facilities, communication means for communicating with an external access system, and means for enabling the rental of any of said plurality of storage units within said plurality of storage facilities from said external access system by a user independently of the location of the user, said external access system allowing the user to communicate with said central processing center to conduct a plurality of automated rental transactions.

12. The system as set forth in claim 11 and further, said external access system comprising kiosk means associated with each of said plurality of storage facilities for allowing a user to conduct said automated rental transactions at each of said plurality of storage facilities without the need for an attendant, said kiosk meads including user feedback means for sending and receiving information to and from a user, fee collecting means for collecting fees from a user, printing means for printing information, unique identification indicia accepting means for allowing a user to execute a contract, electronic communication means for establishing electronic communication with said central processing center, and processing means for coordinating the operation of said user feedback means, said fee collecting means, said printing means, said unique identification indicia accepting means, and electronic communication means.

13. The system as set forth in claim 12 and further, said user feedback means comprising visual display means for visually communicating information to a user.

14. The system as set forth in claim 13 and further, said visual display means including a touch-sensitive screen display having plurality of instructional icons wherein a user may control the operation of said kiosk by manually touching said plurality of instructional icons.

15. The system as set forth in claim 14 and further, said unique identification indicia accepting means comprising means for allowing a user to generate a signature in electronic media to execute said rental agreement.

16. The system as set forth in claim 15 and further, said external access means including video capture means for capturing video images of information during a rental transaction.

17. The system as set forth in claim 16 and further, said fee collecting means including credit card accepting means and check accepting means.

18. The system as set forth in claim 17 and further, said external access means including audio communication means for allowing a customer to establish audio communication with an external audio source.

19. The system as set forth in claim 13 and further, said user feedback means including manual input means for permitting a user to manually type in information for storage in said memory means and manually inputting instructional commands.

20. The system as set forth in claim 11 and further, wherein said external access means comprises computer means for accessing said rental information stored in said storage means within said central processing center.

21. A method of automating self-storage rental transactions, comprising the steps of:

(a) communicatively linking a plurality of self storage facilities to a central processing center, wherein each of said plurality of self storage facilities includes a plurality of self storage units and said central processing center includes electronic storage means containing rental information for each of said plurality of storage units within each of said plurality of self storage facilities; and (b) selectively communicating with said central processing center via external access means to automatically conduct any of a plurality of predetermined rental transaction options without the need for an attendant, said predetermined rental transaction options including the option of renting a self storage unit remote from the external access means.

22. The method as set forth in claim 21, step (b) including the further sub-step of providing kiosk means associated with each of said plurality of storage facilities for allowing a user to conduct said automated rental transactions at each of said plurality of storage facilities.

23. The method as set forth in claim 22, said step of providing kiosk means including the further steps of providing user feedback means for sending and receiving information to and from a user, fee collecting means for collecting fees from a user, printing means for printing information, unique identification indicia accepting means for allowing a user to execute i contract, electronic communication means for establishing electronic communication with said central processing center, and processing means for coordinating the operation of said user feedback means, said fee collecting means, said printing means, said unique identification indicia accepting means, and electronic communication means.

24. The method as set forth in claim 23 and further, said step (b) including the further steps of providing a rent local transactional option for renting from said storage units within a local storage facility where said user is operating said kiosk means, and a rent remote transactional option for renting from said storage units within any of said storage facilities which are remote from said local storage facility.

* * * * *